Dec. 23, 1947.  C. S. WHITING  2,433,251
ANTITORQUE MEANS FOR HELICOPTERS
Filed June 5, 1944
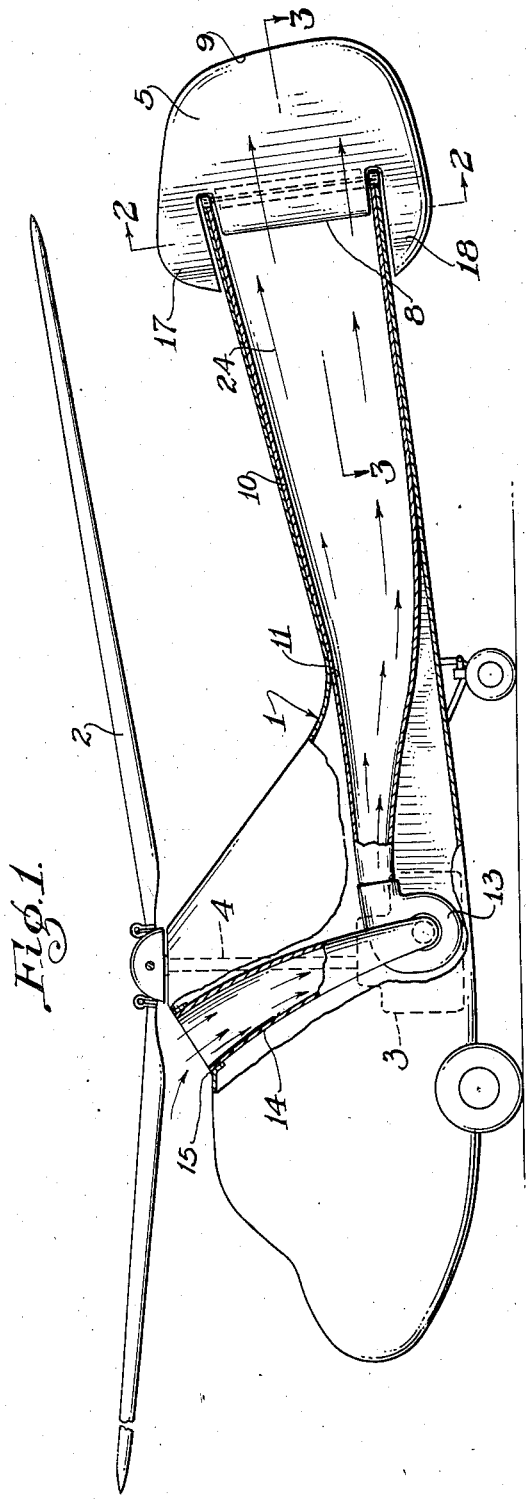
INVENTOR.
Carter S. Whiting
BY
ATTORNEY.

Patented Dec. 23, 1947

2,433,251

UNITED STATES PATENT OFFICE 2,433,251

ANTITORQUE MEANS FOR HELICOPTERS

Carter S. Whiting, Tarzana, Calif.

Application June 5, 1944, Serial No. 538,759

2 Claims. (Cl. 244—17)

1

This invention relates to aircraft, and specifically to helicopters.

At the present time, it is customary in helicopter construction to utilize an auxiliary propeller located at the extremity or tail portion of the fuselage for overcoming torque effect due to rotation of the rotor. This torque effect is in a direction counter to the rotation of the rotor. Such a construction of necessity entails the use of power by way of a separate motor or driven connections with the main motor, thus adding weight which materially detreats from the pay load that might otherwise be carried by the aircraft.

An object of the present invention is to provide in helicopter construction novel means for overcoming counter rotation in the fuselage due to rotor torque.

Another object is the provision in helicopter construction of a novel means for directional control of the craft.

Another object is the provision in helicopter construction of novel means associated with the fuselage which effectively stabilizes the craft, and independent of any stabilizing action by the rotor.

Another object is the provision of a novel fuselage and tail construction which adds to the aerodynamic efficiency of the craft with a minimum of weight.

In the practice of my invention, I have demonstrated that the use of a proper airfoil section at the tail portion of the fuselage functions to counter-act torque of the rotor to the end that there is no counter-rotation of the fuselage during rotor operation. In order to reduce the area of the airfoil and not impair the overall aerodynamic efficiency of the craft, I have provided a novel means for directing a current of air in a given path over said airfoil. The relationship between the airfoil and the means for directing air over said airfoil is such that the airfoil is aerodynamically efficient. The lift coefficient of the airfoil, together with the lever arm that exists between the axis of rotation of the rotor and the airfoil, is sufficient to overcome counter-rotation of the fuselage. Furthermore, the fuselage is so constructed as to have a novel keel surface which aids materially in the overcoming of counter-rotation of the craft.

Other objects include a helicopter which is so constructed as to reduce weight, simplify construction, give more positive control of the aircraft during flight, and which is superior to helicopter constructions now known to the inventor.

In the drawings:

Figure 1 is a side elevation, partly in section, of the improved helicopter,

Figure 2 is a sectional view on the line 2—2 of Figure 1,

2

Figure 3 is a sectional view on an enlarged scale taken on the line 3—3 of Figure 1, and Figure 4 is a sectional view similar to Figure 3, the airfoil being tipped from the position shown in Figure 3.

Referring now to the drawings, the helicopter 1 includes a rotor 2 adapted to be driven by a motor 3 through the medium of a shaft 4. No particular type of motor or shaft connection is contemplated. The fuselage at its tail portion carries an airfoil 5. This airfoil resembles a rudder in that it is movable relative to its vertical axis. The airfoil is elliptical in longitudinal section or is of the double-cambered type, as best illustrated in Figures 3 and 4, the cambered surfaces being designated as at 6 and 7, and wherein 8 is the leading edge, and 9 the trailing edge. The leading edge 8 is adapted to face inwardly of the fuselage 1, as illustrated in the figures. Specifically, the fuselage is so constructed as to provide a duct for the passage of air through said fuselage, and around the airfoil 5. To accomplish this, that portion of the fuselage which extends rearwardly from the engine 3 to the tail or empennage receiving portion is formed to present substantially a constant area duct 10. Specifically, viewing Figure 1, the walls of the fuselage taper or diverge outwardly from the transverse zone indicated by numeral 11 to the point of attachment for the airfoil 5, and viewing Figure 3, it will be seen that the walls of the duct diverge from the zone 12 toward the zone 11. The duct 10 communicates with a blower 13. This blower is driven by the main motor 3 and air is furnished to the blower by means of duct 14 which has its intake opening adjacent the rotor, as indicated at 15. This intake may be positioned at other locations, as is self-evident, although when the rotor is in operation, the duct opening is in the path of the slip stream.

Airfoil 5 is mounted in the end of the fuselage duct in any approved manner, such as by means of a hinge pin 16, and so that a portion of the leading edge 8 is received within the duct. Also, the airfoil is adapted to have portions 17 and 18 lie exteriorly of the fuselage and forwardly of the hinge point for the purpose of counter-balancing the airfoil in the usual manner. As stated, a portion rearward of the leading edge 8 of the airfoil is received within the duct 10 and in such a manner that one side 19 of said duct overlies a portion of the surface 6. This portion 19 is slightly inwardly concaved, as shown at 20. The opposite side wall portion of the duct, here indicated as 21, does not overlie the surface 7 of the airfoil but terminates inwardly of the leading edge 8. This duct-type fuselage provides top and bottom wall portions 22 and 23 which permit ready attachment of the airfoil 5 to the fuselage through the medium of the pin 16 (see Figure 2).

The operation, uses, and advantages of the invention are as follows:

When the motor 3 is in operation, the blower 13 may have its fan driven by suitable connections and air will be drawn through the duct 14 and outwardly through duct 10. This air follows the path generally indicated by the arrows 24 in the several figures, and past the airfoil 5. Due to the fact that the airfoil is of the cambered type, the lifting characteristics of the airfoil are appreciably increased over that for a flat plane, for instance. As one side 19 of the duct spacedly overlies the cambered surface 6 inwardly from its leading edge 8, the air through the duct is given a directed path of movement at this zone. This overlying portion 19 of the duct functions in the same manner as does a wing slot and preserves the continuity of the airflow at high angles of incidence of the airfoil (see dotted line position 25 in Figure 4). When the airfoil is moved to the full line position of Figure 4, the leading edge 9 is closely adjacent the portion 21 of the side wall of the duct. However, air may flow between these portions, as indicated by the arrows at 26. The majority of air, however, is directed over the surface 6. This construction of the duct is such as to increase the aerodynamic efficiency of the airfoil with relation to air flow through the duct. Knowing the center of pressure for the particular airfoil section selected, and the distance from said center of pressure to the axis of rotation for the rotor, together with the actual lift coefficient of said airfoil, it is a simple matter to determine the area of an airfoil sufficient to overcome the torque of the rotor when the rotor is operating, and to prevent counter-rotation of the fuselage. Quite obviously, if the rotor should cease operation, due to motor failure, proper engineering design would indicate that the rotor should autorotate. Of course, auto-rotation does not induce torque effect and, therefore, there would be no necessity of providing any air flow past the airfoil by means of the blower. However, as an aid in stabilizing the craft, the fuselage has been constructed in the manner previously described for the purpose of providing a large keel surface, such as presented by the side walls of the fuselage and which aids in preventing any unwanted rotation of the fuselage. Furthermore, the type of fuselage serves to direct the path of air flow effectively over the airfoil during forward movement of the aircraft. For all rotational speeds of the rotor, the pilot may select a suitable angle of incidence for the airfoil. Directional control, irrespective of the rotor, may be readily accomplished by movement of the airfoil 5.

In Figure 1, it is assumed that the rotor revolves anti-clockwise and the torque will be in the opposite direction, which would tend to revolve the fuselage clockwise. Hence, the surface 6 for the airfoil 5 would be in the position indicated in Figures 3 and 4.

I claim:

1. A helicopter having a fuselage, including a duct in said fuselage and through which air is passed, said duct extending substantially the length of the fuselage and diverging in vertical dimension from one end toward the empennage portion of the fuselage, and likewise diverging in transverse dimension from the empennage portion toward the opposite end of said duct, to provide a substantially constant area duct.

2. A helicopter having a fuselage and a rotor positioned for rotation above said fuselage, said fuselage provided with a duct extending to the empennage portion thereof and through which air is passed, said duct diverging in vertical dimension from one end toward the empennage portion to provide at said portion two spaced apart vertical surfaces, one of which surfaces is of greater length than the other; a cambered air foil having a leading edge, a portion of which is positioned within said duct at the empennage portion with the duct surface of greatest length overlying in part the leading edge portion of the cambered air foil, and the other vertical surface of said duct terminating forward of the leading edge of the cambered air foil; the arrangement being such that the space between the overlying vertical duct surface and said cambered air foil functions as a wing slot; means for mounting the air foil for angular movement relative to the vertical duct surfaces, the said air foil functioning when air is directed through the duct and over the air foil as an anti-torque means for the fuselage, the rotor being in motion.

CARTER S. WHITING.

REFERENCES CITED

The following references are of record in the file of this patent:

UNITED STATES PATENTS

| Number | Name | Date |
|---|---|---|
| 2,041,789 | Stalker | May 26, 1936 |
| 1,744,889 | Hammons | Jan. 28, 1930 |
| 2,396,130 | Sbrilli | Mar. 5, 1946 |
| 1,922,167 | Leray | Aug. 15, 1933 |
| 2,383,038 | Bossi | Aug. 21, 1945 |
| 2,384,893 | Crook | Sept. 18, 1945 |
| 1,559,091 | Hall | Oct. 27, 1925 |